United States Patent
Perona et al.

(10) Patent No.: US 6,671,809 B1
(45) Date of Patent: Dec. 30, 2003

(54) SOFTWARE-DEFINED COMMUNICATIONS SYSTEM EXECUTION CONTROL

(75) Inventors: Richard Allen Perona, Gilbert, AZ (US); Clifford Andrew Williams, Phoenix, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/568,771

(22) Filed: May 10, 2000

(51) Int. Cl.[7] .................................................. G06F 1/00
(52) U.S. Cl. ...................... 713/200; 713/168; 713/169; 713/1; 713/2; 713/100
(58) Field of Search .................................. 713/200, 151, 713/164, 167, 168, 169, 1, 2, 100; 235/375, 379, 380, 382, 382.5, 384; 709/200, 214; 707/1, 100

(56) References Cited

U.S. PATENT DOCUMENTS

| | | | | |
|---|---|---|---|---|
| 5,675,748 A | * | 10/1997 | Ross ........................... | 710/104 |
| 5,745,570 A | * | 4/1998 | Voldal ......................... | 713/167 |
| 5,841,869 A | * | 11/1998 | Merkling et al. ............ | 713/164 |
| 5,845,068 A | * | 12/1998 | Winiger ....................... | 713/200 |
| 6,070,796 A | | 6/2000 | Sirbu ........................... | 235/382 |
| 6,108,670 A | * | 8/2000 | Weida et al. ................ | 707/203 |
| 6,317,832 B1 | * | 11/2001 | Everett et al. ............... | 713/172 |
| 6,363,478 B1 | * | 3/2002 | Lambert et al. ............. | 713/151 |
| 6,481,632 B2 | * | 11/2002 | Wentker et al. .............. | 235/492 |
| 6,507,875 B1 | * | 1/2003 | Mellen-Garnett et al. ... | 709/310 |
| 6,519,624 B1 | * | 2/2003 | Gruber ........................ | 709/200 |
| 6,564,252 B1 | * | 5/2003 | Hickman et al. ............ | 709/214 |
| 6,609,199 B1 | * | 8/2003 | DeTreville ................... | 713/172 |

FOREIGN PATENT DOCUMENTS

| | | | |
|---|---|---|---|
| EP | 292248 A | * | 11/1988 |
| WO | 9707448 | | 2/1997 |
| WO | 9966387 | | 12/1999 |

* cited by examiner

*Primary Examiner*—Ly V. Hua
(74) *Attorney, Agent, or Firm*—Jenner & Block, LLC

(57) ABSTRACT

Software execution control in which a series of two-way rule checks is performed between software-defined communications system component records to ensure and maintain system security and integrity. A system platform (20) performs a series of two-way rule checks between records of a system platform (20) and an application (22) called by the platform (20), between records of the called application (22) and a module (24) that defines the called application (22), and between the records of the module (24) that defines the called application (22) and the platform (20). Both the called application (22) and the module (24) that defines the called application (22) are then instantiated if the two-way rule checks are successful. Because the rule checks are performed in a two-way manner, restrictions such as licensing and source restrictions may be placed not only on system modules (24–30), but also on the applications (22) using the modules (24–30), thereby enabling higher levels of system security to be achieved. In addition, the present invention minimizes processing overhead by providing for load-time rule checking rather than run-time checking associated with conventional enforcement systems.

20 Claims, 3 Drawing Sheets

SOFTWARE-DEFINED COMMUNICATIONS SYSTEM EXECUTION CONTROL

BACKGROUND OF THE INVENTION

1. Field of the Invention

The present invention relates generally to open architecture software systems, and particularly to software execution control in which a series of two-way rule checks is performed among system components based on predefined configuration and rule information for each of the components to enhance overall system security and integrity.

2. Description of Related Art

Open architecture communications systems are typically defined by a plurality of software applications, each of which is defined by one or more corresponding hardware and software modules. These underlying software and hardware modules are usually created and supplied by numerous vendors. In such systems, it is common for new versions of software modules to be periodically downloaded to upgrade existing modules, existing hardware modules to be periodically replaced or upgraded, and new hardware and software modules to be added to the system.

For security, licensing and compatibility-related reasons, it may be necessary to control usage of certain software modules in such systems. For example, usage of a particular module could be restricted to ensure that the module worked only in combination with certain other modules. Also, restrictions could limit the use of software modules with only certain versions of hardware modules. Further, restrictions on certain software modules may require that the modules be endorsed or certified by a particular organization, that the modules originate from trusted sources, and/or that the modules have not been modified.

Existing execution control techniques are capable of determining the source and integrity of software modules, and are capable of preventing the use of certain modules if a license for those modules is not present. However, these techniques are not capable of enabling a module to cross-check other modules that may have originated from other vendors. In addition, the techniques typically perform checking during execution of the modules or application, and are therefore not capable of asserting additional rules prior to execution to increase system integrity.

SUMMARY OF THE INVENTION

The invention is directed to a method of controlling operation of an open architecture system including a system platform, a plurality of stored applications, and a plurality of stored modules for realizing the stored applications. The method includes the steps of performing a two-way rule check between the system platform and a called application; performing a two-way rule check between the called application and a module identified by the called application as being necessary to execute the called application; performing a two-way rule check between the module identified by the called application and the system platform; and instantiating both the called application and the module identified by the called application if the performing of a two-way rule check between the system platform and a called application, the performing of a two-way rule check between the called application and a module identified by the called application, and the performing of a two-way rule check between the module identified by the called application and the system platform are successful.

The invention also is directed to an open architecture software-defined system including a computing platform; a plurality of applications each for performing a predetermined system operation when called by the system platform; a plurality of modules each, either singly or in combination with others of the plurality of modules, for defining one of the plurality of applications, each of the plurality of applications including one of more module pointer records for identifying an application-defining module or modules; the computing platform for performing two-way rule checks among records of the computing platform, a called application from the plurality of applications, and an application-defining module or modules defining the called one of the plurality of applications prior to loading the called application and the application-defining module or modules.

The invention is further directed to an open architecture software-defined communications system, including a plurality of modules each independent from one another and each for executing one of a predetermined hardware and software function; a plurality of applications and each defined by at least one of the plurality of modules; and a computing platform for selectively calling each of the plurality of applications based on received application commands, for enforcing loading of a called application based on rules of the computing platform, the called application and one or more of the plurality of modules that define the called application, and for initiating a series of two-way rule checks among the computing platform, the called application and the one or more of the plurality of modules that define the called application to ensure load-time enforcement of rules of the computing platform, the called application and the one or more of the plurality of modules that define the called application.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
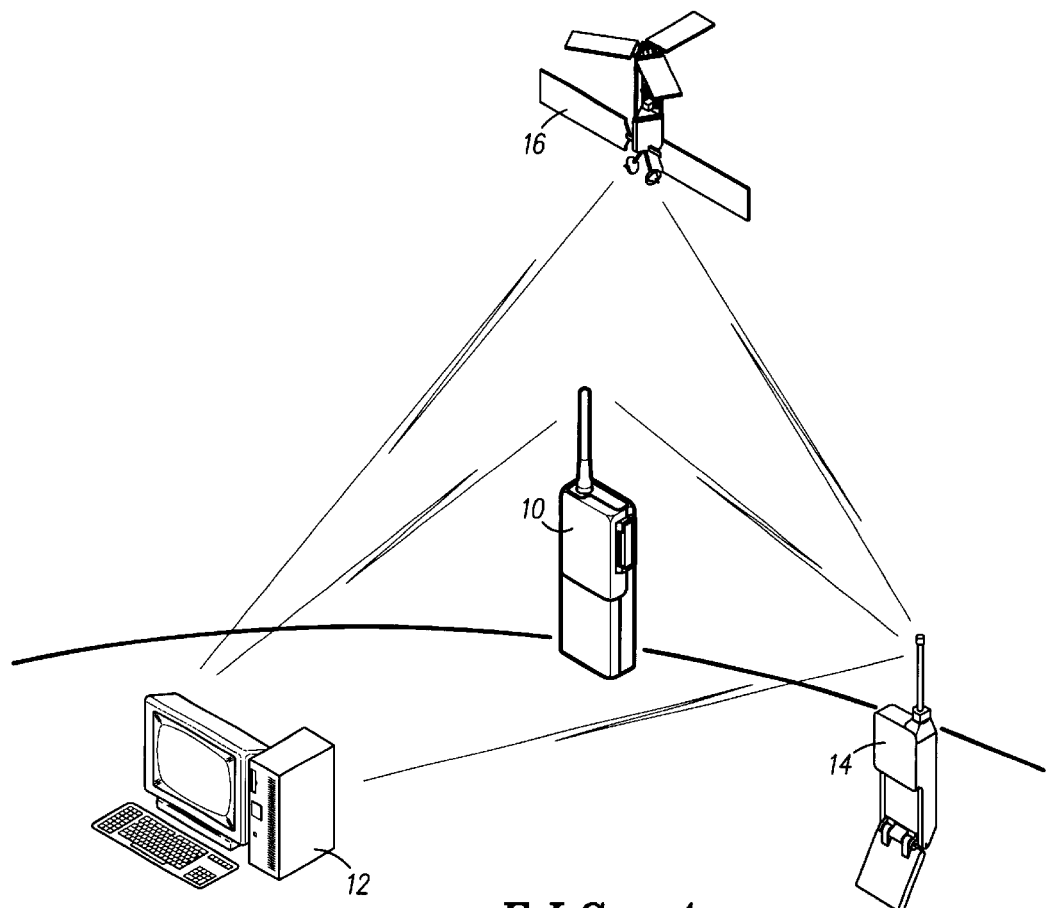
FIG. 1 is a block diagram illustrating a first exemplary open architecture system including the execution control of the present invention.

Referring now to the drawings in which like numerals reference like parts, FIG. 1 shows components of a software-defined open architecture communications system 10 of the type in which the present invention is implemented. The system 10 has numerous hardware and software components that can be individually removed, replaced, upgraded and/or otherwise modified without having to correspondingly modify all other system components. According to a preferred embodiment of the present invention, the system 10 is a Wireless Information Transmitting System (WITS) in the form of a radio designed and sold by Motorola Corp., the assignee of the present invention. Such a system may interface to a wide variety of other communications devices such as, for example, internet portals such as a personal computer 12, wireless communications devices such as a cellular phone 14, and a communications satellite 16, as well as other WITS systems (not shown).

The operation of each of the components in the above-described radio 10 is defined by software that is pre-loaded into the radio and then typically upgraded on a periodic basis. The software itself is composed of numerous components that may be bundled together and provided by a single vendor, or, more typically, individually provided by two or more vendors. In the latter situation, the execution control of the present invention enables software components from multiple vendors to be individually loaded, upgraded or replaced in a manner that ensures that only components that are licensed or otherwise approved for use with one another may be utilized in combination. Such an open architecture system provides system designers with a high degree of flexibility both in maintaining the system and in modifying the system as system communications requirements change, while at the same time maintaining the underlying integrity of the radio 10.

Figure 2:
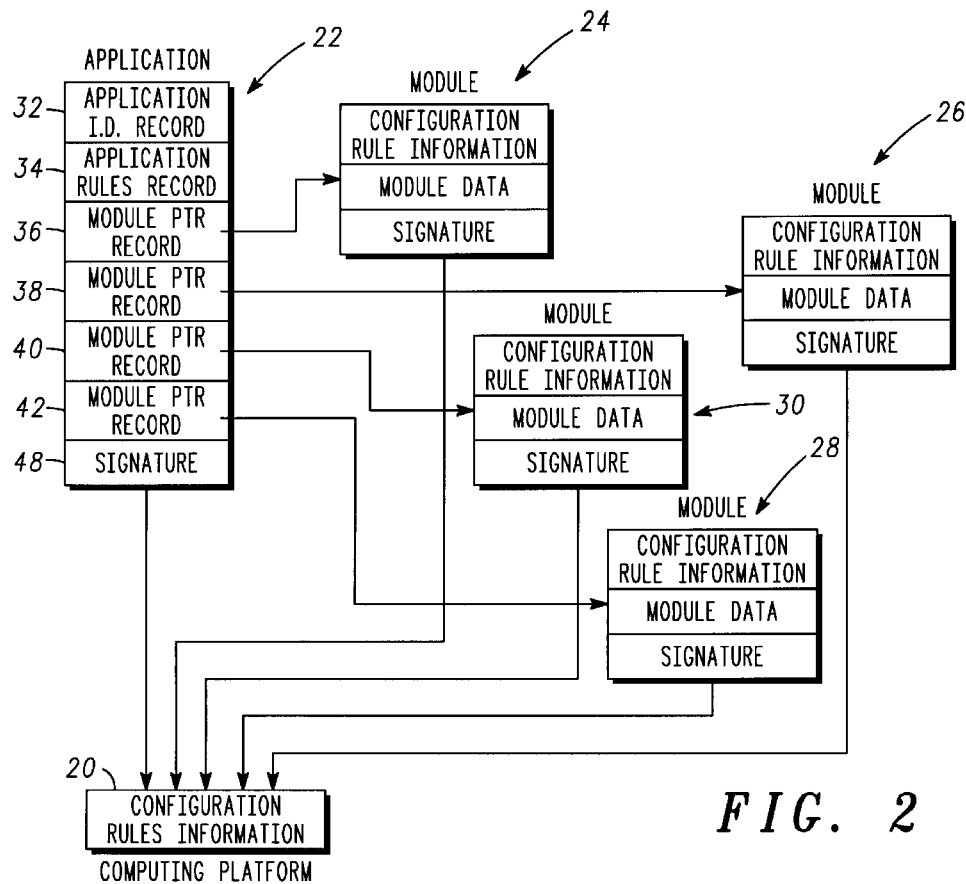
FIG. 2 is a block diagram of the software components of the execution control of the present invention.

FIG. 2 shows exemplary software components of the radio 10 of FIG. 1. The components include a computing platform 20, an application 22 and several modules 24, 26, 28, 30. However, it should be appreciated that the number of applications and modules may vary depending on the specific underlying computer platform. Each of these software components 20–30 interacts with others of the components to define the operation of the radio 10 pursuant to the execution control of the present invention as will be described below in more detail.

The computing platform 20 is hardware based and is the operating system of the radio 10. In the above-discussed WITS radio system, the computing platform 20 includes platform identification information that uniquely identifies the platform when checked by other software components as will be discussed later, and rules information that includes conventional types of rules such as required application endorsements, module endorsements and capacity constraints, as well as other vendor-specific rules concerning the application 22 or modules 24–30 such as, for example, locality of use or period of use rules.

In FIG. 2, the application 22 defines an algorithm that enables the radio 10 to execute a pre-defined function. The application 22 is defined by a series of records, including an identification record 32 that contains information such as application name, type, version, source, endorsements, and possibly other information such as feature lists. This identification record 32 therefore uniquely identifies the application and provides information about the application that may subject the application to module or platform rules and constraints. Put another way, the application identification record 32 contains information that may limit its usage of certain modules and may limit its usage or the extent of its usage by the platform 20. For example, the application record 32 may or may not include security clearance data indicating that the application has been approved for use by the platform 20. An application rules record 34 contains application constraints that must be met and validated by the platform before the platform can load the application. This rules record 34 may include conventional application types of rules such as required platform endorsements, capacity constraints, and required platform type, as well as other vendor-specific rules such as locality of use or period of use rules. In other words, an application vendor can impose its own security/integrity constraints and requirements on a platform through the application to protect the application from fraudulent or otherwise unauthorized use.

The application 22 also includes module pointer records 36, 38, 40, 42 that incorporate the modules 24, 26, 28, 30, respectively into the application 22. As shown, a module pointer record is utilized for each module incorporated into the application 22. While the application 22 is shown incorporating the four modules 24, 26, 28, 30, the actual number of modules incorporated by an application may be only one, or may be more than four depending on the required function of the application. Also, the pointer records 36–42 may impose requirements on the pointed-to modules 24–30 that must be met by the modules 24–30 before the platform 20 is able to load the modules 24–30. For example, the application 22 may require that some or all of the modules 24–30 be digitally signed by an application certification/endorsement organization, or that some or all of the modules 24–30 originate from a particular vendor.

Figure 3:
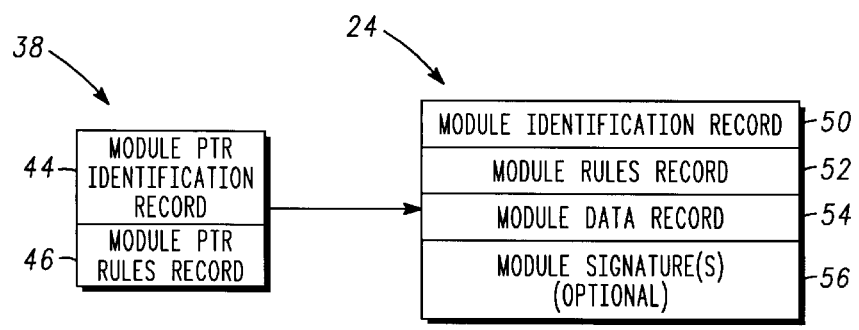
FIG. 3 is a block diagram showing a module pointer record and module of FIG. 2 in greater detail.

As shown in FIG. 3, a module pointer record such as the module pointer record 38 actually includes both a module pointer identification record 44 and a module pointer rules record 46. The module pointer identification record 44 provides information about the requested module 24 such as module name, type, version and source. The module pointer rules record 46 includes conventional types of pointer record rules specifying requirements and limitations imposed on the referenced module by the developer of the application. Such requirements and limitations may include conventional rules such as required module endorsements, required module version, and interoperability information, as well as vendor-specific rules such as locality of use or period of use rules. In the above-discussed WITS radio 10, one example of a module requirement might be a waveform requirement of licensed module developer and Federal Communications Commission signatures in an RF module. Before the platform 20 can load the referenced module, the platform must verify that the limitations and requirements specified in the module rules record 46 are met, thereby enabling the application 22 to check the rule compliance of the module 24 before the module 24 is loaded onto the platform 20 for execution.

In addition, the application may also include a signature record (or records) 48 including a digital signature (or signatures), such as a cryptographic signature or signer certification information, identifying the application vendor and/or other organizations: associated with the development and/or distribution of the application. Such signature record authenticates the source of the application 22, and may be required if a particular module requires the presence of the signature prior to being loaded onto the platform 20, or if the platform 20 requires the presence of the application signature before it can load the application 22. According to a preferred embodiment of the present invention, more than one digital signature may be required, with each digital signature covering all application records except other signatures.

Referring again back to FIG. 2, each of the modules 24–30 is a separate library of software that is used by the application 22 and that, when called by the application 22, executes a specific function required to implement the application. In the above-discussed WITS embodiment, for example, each of the modules may each perform a function associated with, for example, one of data encryption, signal processing, protocol processing, network communications planning, or signal modulation.

Referring to FIG. 3, the contents and function of only the module 24 will be discussed in detail, with it being understood that the basic make-up and function of the other modules 26–30 is similar. The module 24 includes a module identification record 50, a module rules record 52, a module data section 54 and an optional module signature record or records 56. The module identification record 50 provides unique identifying information for the module 24 as well as module information that may subject the module to application or platform rules or limitations. The identifying information may include such information as module name, type, version, source and endorsements, as well as other information such as information concerning locality of use or period of use.

The module rules record 52 identifies module requirements or constraints with respect to the application 22 and the platform 20. Such requirements/constraints may include, for example, allowable module combinations, module/application digital signal requirements, and platform environment requirements, such as an RF module requirement that specific hardware components must be available before the module can be loaded onto the platform 20. According to one preferred embodiment, a classified cryptographic algorithm application requires that the calling application be signed by the National Security Agency before the module can be loaded onto the platform. Such a requirement could be implemented by including an X.509 attribute certificate in the rules record. Therefore, a module vendor can impose its own security/integrity constraints and/or requirements on either or both of the platform 20 and the application 22 to protect the module from fraudulent or otherwise unauthorized use.

The module data record 54 holds the executable code for the module and is loaded by the platform 20 if the signature and all module rules record rule checks are successful. Also, the module signature record (or records) 56 holds a digital signature (or signatures) from the module vendor or other associated entities if the platform 20 and/or the application 22 require validation of a module signature during a rule check of the module 24 prior to loading and therefore prior to the platform 20 running the application 22. For example, when the platform 20 must ensure that a module 24 originated from a trusted source, such as the National Security Agency, the trusted source must supply its digital signature to the signature record 56 and may be validated by the platform 20 at the time of loading the module 24 onto the platform 20.

Figure 4:
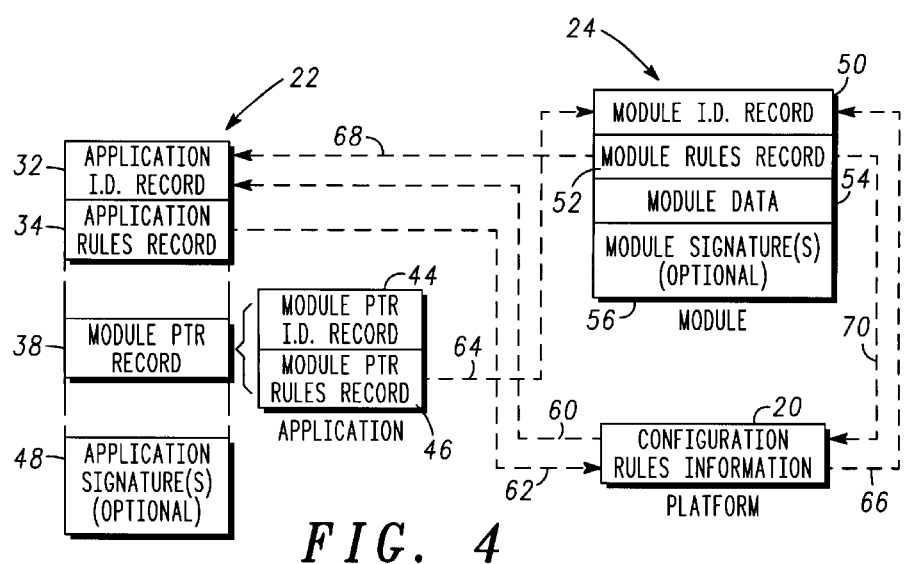
FIG. 4 is a block diagram illustrating the sequence of rule checks among records of system components when a system platform calls a system application.

With reference now to FIG. 4, operation of the present invention will now be described with respect to the communications device 10, the computing platform 20, the application 22 and the module 24. Specifically, the series of two-way rule checks executed by the execution control of the present invention among system components during loading of the application 22 and the module 24, and therefore prior to application run-time, will now be described. In the following discussion of the operation of the present invention, the term "rule check" is used to refer to the validation of numerous rules and other requirements that must be met by some or all of the system components during application/module loading and prior to application run-time. Such rules/requirements may include source authentication, certification/endorsement status, platform capabilities, record corruption status, and security clearance status rules and requirements. However, the exact requirements imposed by a system component on other components may vary according to system and vendor needs.

Initially, at 60, the platform 20 receives a user request to load and execute the application 22 and subsequently checks the application identification record 32 against the platform rules and configuration information and parses the module pointer record 38. Additionally, the platform 20 may also check the application signature record 48 if an extra measure of security/integrity is desired. At the same time, at 62 the platform 20 checks the integrity of the platform rules and configuration information to determine per the application rules record 34 if the platform 20 is authorized through, for example, a vendor license agreement, to load the application 22.

Upon receiving the loading command from the platform 20, at 64 the platform checks the contents of the module identification record 50 against the module pointer rules record 46 to verify both the integrity and the source of the module 24. Also, the platform 20 at 66 accesses and checks the integrity of the module 24 by checking the module identification record 50. Subsequently, the platform 20 at 68 checks the integrity of both the application 22 per the application identification record 32 and itself at 70 per the platform rules and configuration information against the module rules record 52 to determine if both the application 22 and the platform 20 meet all requirements of the module 24.

If each of the above two-way rule checks is successful, the platform 20 completes instantiation of the application 22 and the module 24, and execution of the underlying application can then be carried out. If, however, any of the rule checks performed at 60–70 fails, the platform terminates loading the application 22. In other words, if, for example, the application 22 determines via the rule check at 64 that the module identification record file 50 does not contain the necessary licensing agreement between the application vendor and the module vendor, or that the module security or data has been compromised, the application 22 will not allow the platform 20 to download the module 24, and instantiation of the application 22 will be terminated.

At this point it should be understood that, while FIG. 4 shows a series of two-way rule checks among the platform 20, the application 22 and the module 24, the checks at 62, 64, 68 and 70 and as described above are actually performed by the platform 20. More specifically, the platform 20 must load the application 22 and the module 24 in conjunction with the rules contained in the platform configuration and rules information, the application rules record 34, the module pointer rules record 46 and the module rules record 52. Therefore, the application 22 and the module 24 must trust the platform 20 to perform the checks at 62, 64, 68 and 70, to terminate loading of the application 22 if any of the checks fail, and to remove any part of the application 22 that has been loaded if loading of the application 22 is terminated.

In addition, the checks performed by the platform at 60 and 66 may include the validation of digital signatures stored in the application and module signature records 48, 56, respectively.

Figure 5:
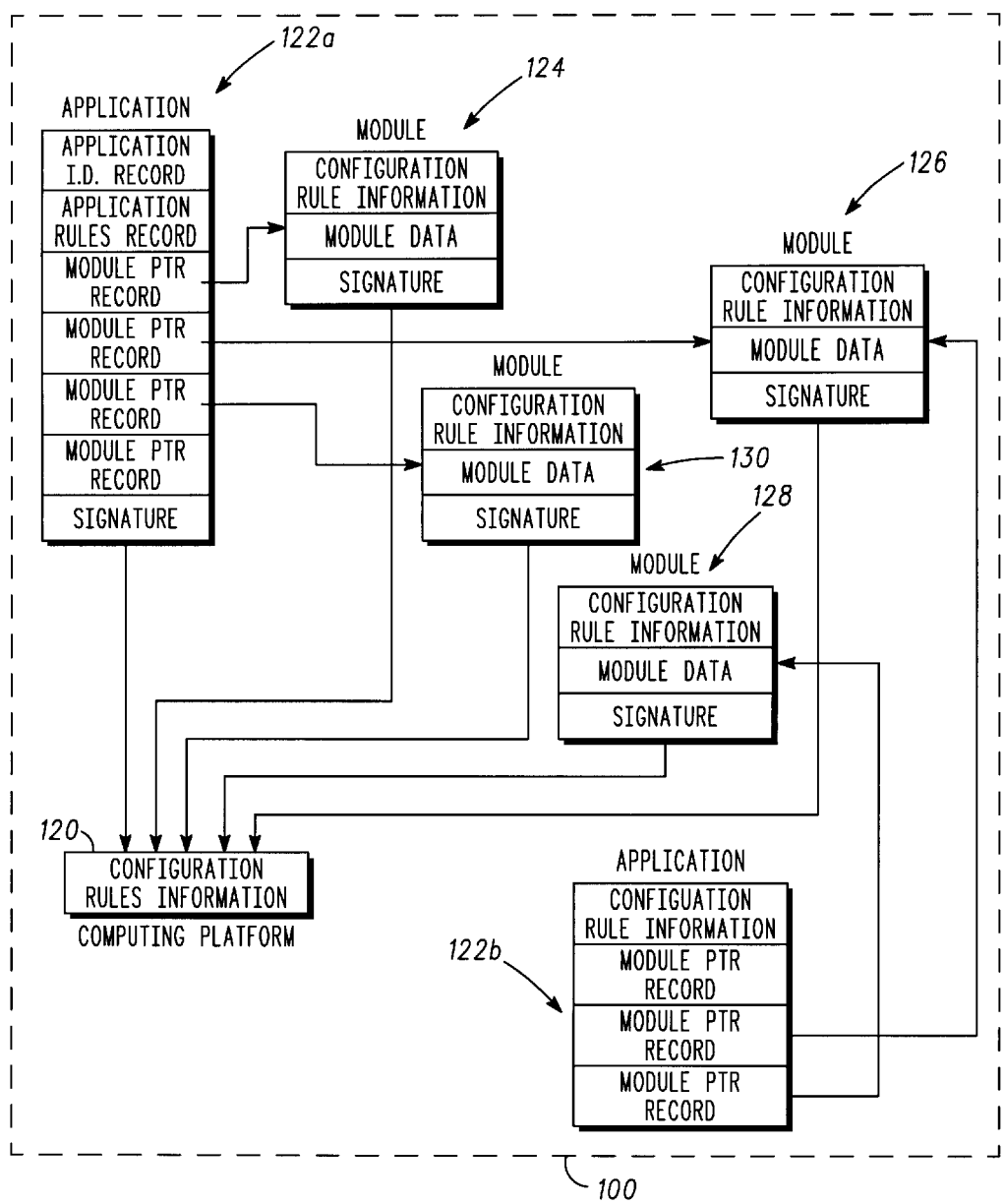
FIG. 5 is a block diagram illustrating a second exemplary open architecture system including the execution control of the present invention.

While only the methodology of the present invention has been described with reference to the exemplary platform 20, application 22 and module 24, it should be appreciated that the execution control of the present invention may be utilized in an open software environment including any number of applications and modules. It should also be appreciated that, in a multiple application system, certain of the modules may be utilized by more than one application. FIG. 5 shows an example of a communications device 100 including a platform 120, two separate applications 122a, 122b and four separate modules 124, 126, 128, 130, with the module 126 being utilized to define in part both of the applications 122a, 122b.

As can now be appreciated from the foregoing description, the execution control system and methodology of the present invention enables unallowable software, such as unlicensed, unauthorized or compromised software, to be detected in a manner that has minimal run-time impact and to be prohibited from being loaded. Therefore, an open architecture system such as the one described above can be expanded and improved over time in a secure and controllable manner and in a manner that provides license and usage protection to third-party developers. In addition, the present invention enables system licensing and security requirements to be enforced in environments that are typically difficult to enforce licensing and security requirements, such as in systems exported and used overseas.

While the execution control of the present invention has been described as being implemented in a Wireless Information Transmitting System (WITS) radio 10, the execution control of the present invention may be implemented in other software-defined communications devices having open architectures such as, for example, the personal computer 12, the cellular phone 14, or the satellite 16 shown in FIG. 1, or, even more generally, in any open architecture software-defined environment having a computing platform such as the computing platform 20 shown in FIG. 2.

While the above description is of the preferred embodiment of the present invention, it should be appreciated that the invention may be modified, altered, or varied without deviating from the scope and fair meaning of the following claims.

What is claimed is:

1. A method of controlling operation of an open architecture system including a system platform, a plurality of stored applications, and a plurality of stored modules for realizing the stored applications, the method comprising:

performing a two-way rule check between the system platform and a called application;

performing a two-way rule check between the called application and a module identified by the called application as being necessary to execute the called application;

performing a two-way rule check between the module identified by the called application and the system platform; and instantiating both the called application and the module identified by the called application if the performing of a two-way rule check between the system platform and a called application, the performing of a two-way rule check between the called application and a module identified by the called application, and the performing of a two-way rule check between the module identified by the called application and the system platform are successful.

2. The method of claim 1, further comprising executing the called application by executing the module identified by the called application subsequent to the instantiating of both the called application and the module identified by the called application.

3. The method of claim 1, wherein:

the performing of a two-way rule check between the called application and a module identified by the called application comprises performing a two-way rule check between the called application and a plurality of modules identified by the called application;

the performing of a two-way rule check between the module identified by the called application and the system platform comprises performing two-way rule checks between the plurality of modules identified by the called application and the system platform; and the instantiating of both the called application and the module identified by the called application comprises instantiating both the called application and the plurality of modules identified by the called application if the performing of a two-way rule check between the system platform and the called application, the performing of a two-way rule check between the called application and the plurality of modules identified by the called application, and the performing of a two-way rule check between the plurality of modules identified by the called application and the system platform are successful.

4. The method of claim 1, wherein the performing of a two-way rule check between the system platform and a called application comprises:

checking an application rules record against stored platform configuration and rules data; and checking the stored system platform configuration and rules data against an application identification record.

5. The method of claim 4, wherein the performing of a two-way rule check between the system platform and a called application further comprises parsing module pointing records of the called application to determine module data to be loaded.

6. The method of claim 4, wherein the performing of a two-way rule check between the system platform and a called application further comprises validating a signature of the called application.

7. The method of claim 6, wherein the open architecture system is a communications system.

8. The method of claim 1, wherein the performing of a two-way rule check between the called application and the module identified by the called application comprises:

checking a module pointer rules record of the module identified by the called application; and checking an identification record of the called application against a module rules record.

9. The method of claim 1, wherein the performing of a two-way rule check between the module identified by the called application and the system platform comprises:

checking a module identification record against platform rules and configuration information; and checking the system platform rules and configuration information against a module rules record.

10. An open architecture software-defined system, comprising:

a computing platform;

a plurality of applications each for performing a predetermined system operation when called by the system platform;

a plurality of modules each, either singly or in combination with others of the plurality of modules, for defining one of the plurality of applications;

each of the plurality of applications including one or more module pointer records for identifying an application-defining module or modules;

the computing platform for performing two-way rule checks among records of the computing platform, a called application from the plurality of applications, and an application-defining module or modules defining the called one of the plurality of applications prior to loading the called application and the application-defining module or modules.

11. The open architecture software-defined system of claim 10, wherein the computing platform is for performing a two-way rule check between the application-defining module or modules defining the called one of the plurality of applications and the system platform by checking a signature of the application-defining module or modules defining the called one of the plurality of applications.

12. The open architecture software-defined system of claim 11, wherein the open architecture software-defined system is a communications system.

13. The open architecture software-defined system of claim 12, wherein the communications system is a wireless radio.

14. The open architecture software-defined system of claim 10, wherein each of the plurality of applications includes at least one record selected from the group consisting of:
   an identification record including application identifying information;
   a rules record including one or more of platform endorsements, capacity constraints, platform compatibility information and vendor-specific rules;
   at least one module pointer record for identifying application-defining modules from the plurality of modules; and
   at least one signature record for identifying an authorized application entity.

15. The open architecture software-defined system of claim 14, wherein the at least one module pointer record comprises:
   a module pointer identification record including module name, type, version and source information; and
   a module pointer rules record including one or more of required module endorsements, required module version information, module interoperability information and vendor-specific platform rules.

16. The open architecture software-defined system of claim 10, wherein each of the plurality of modules comprises:
   an identification record including one or more of module name, type, version, source, endorsements and additional information;
   a rules record including one or more of required application endorsements, required platform endorsements, capacity constraints, platform type and required resources information and vendor-specific application and/or platform rules; and
   executable module code.

17. The open architecture software-defined system of claim 16, wherein each of the plurality of modules further comprises at least one signature record including at least one signature and at least one corresponding signature certificate.

18. The open architecture software-defined system of claim 10, wherein the computing platform includes a platform rules record including information on one or more of required application endorsements, required module endorsements and capacity constraints, platform-specific application/module rules and vendor-specific application/module rules.

19. The open architecture software-defined system of claim 10, wherein the open architecture software-defined system is a wireless communications system.

20. An open architecture software-defined communications system, comprising:
   a plurality of modules each independent from one another and each for executing one of a predetermined hardware and software function;
   a plurality of applications each defined by at least one of the plurality of modules; and
   a computing platform for selectively calling each of the plurality of applications based on received application commands, for enforcing loading of a called application based on rules of the computing platform, the called application and one or more of the plurality of modules that define the called application, and for initiating a series of two-way rule checks among the computing platform, the called application and the one or more of the plurality of modules that define the called application to ensure load-time enforcement of rules of the computing platform, the called application and the one or more of the plurality of modules that define the called application.

* * * * *